US010591590B1

(12) United States Patent
Anvari

(10) Patent No.: US 10,591,590 B1
(45) Date of Patent: Mar. 17, 2020

(54) CONTROL ALGORITHM FOR WIRELESS SENSOR TO ESTIMATE AND CALCULATE ENVIRONMENTAL PARAMETERS

(71) Applicant: Kiomars Anvari, Walnut Creek, CA (US)

(72) Inventor: Kiomars Anvari, Walnut Creek, CA (US)

(73) Assignee: Kiomars Anvari, Walnut Creek, CA (US)

( * ) Notice: Subject to any disclaimer, the term of this patent is extended or adjusted under 35 U.S.C. 154(b) by 873 days.

(21) Appl. No.: 15/071,910

(22) Filed: Mar. 16, 2016

Related U.S. Application Data

(63) Continuation of application No. 62/157,936, filed on May 6, 2015.

(51) Int. Cl.
*G01S 13/58* (2006.01)
*G01S 13/62* (2006.01)

(52) U.S. Cl.
CPC .......... *G01S 13/584* (2013.01); *G01S 13/588* (2013.01); *G01S 13/62* (2013.01)

(58) Field of Classification Search
CPC ................................................ G01S 13/02–64
See application file for complete search history.

(56) References Cited

U.S. PATENT DOCUMENTS

| | | | | |
|---|---|---|---|---|
| 4,012,737 | A * | 3/1977 | Waer | F41G 7/2286 342/103 |
| 6,989,783 | B1 * | 1/2006 | Matich | G01S 7/354 342/145 |
| 8,068,051 | B1 * | 11/2011 | Osterweil | A61B 5/1117 340/573.1 |
| 9,081,085 | B2 * | 7/2015 | Fukuda | G01S 13/0209 |
| 9,678,202 | B2 * | 6/2017 | Nagy | G01S 13/48 |

* cited by examiner

*Primary Examiner* — Matthew M Barker

(57) ABSTRACT

A control algorithm for wireless sensor to estimate and calculate environmental parameters. The control algorithm comprises a method to calculate the distant between an approaching object to wireless sensor receive antenna by measuring the travelling time between completion of transmission of transmit signal at the transmit antenna and completion of reception of the reflected transmit signal at the receive antenna, a method of calculating the approaching speed of an object to wireless sensor receive antenna by using multiple distance measurements, and a method to calculate impact force from an approaching object based on estimated mass of the object and deceleration of its speed.

4 Claims, 5 Drawing Sheets

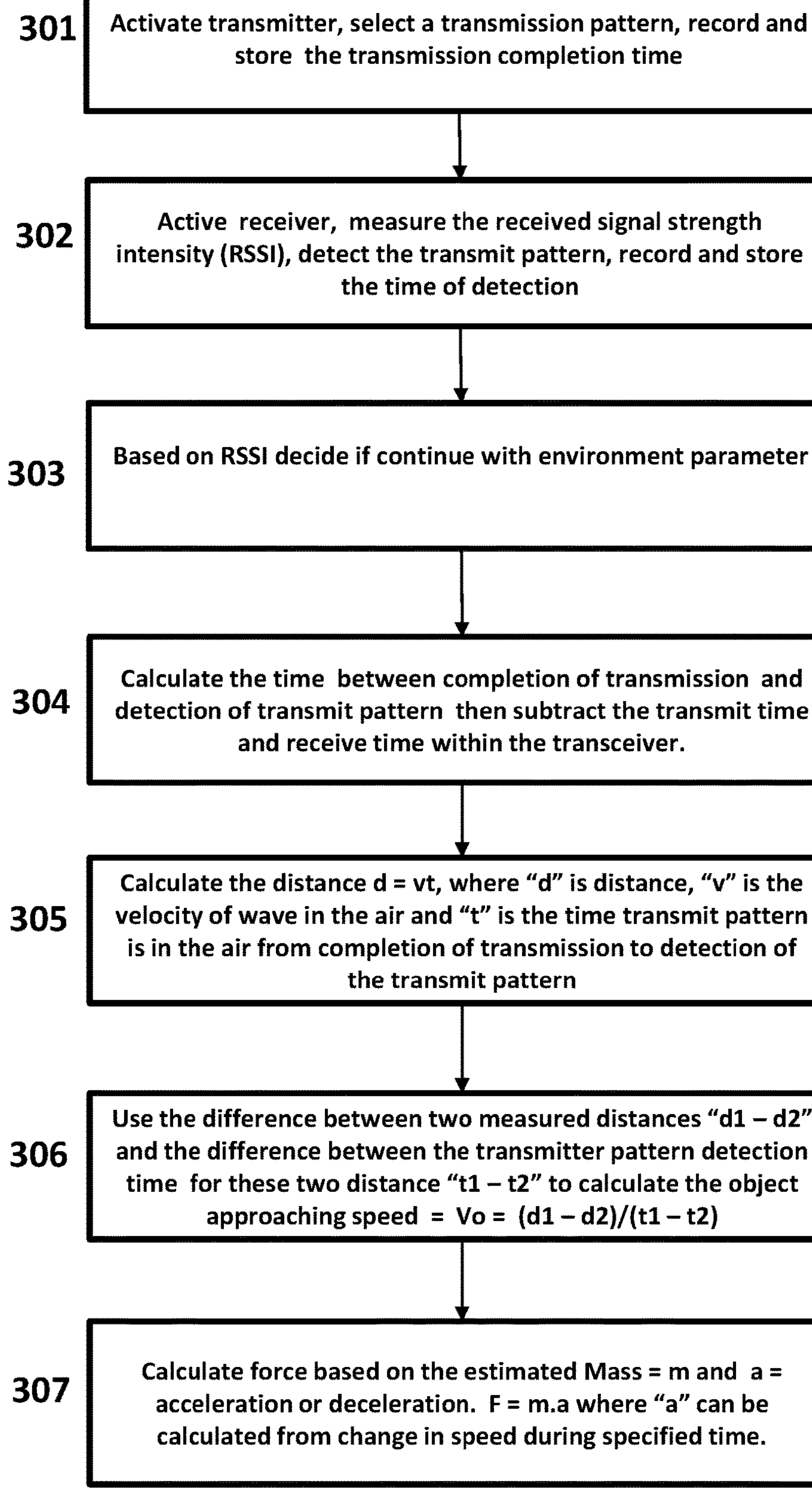
300
FIG 3
301
Activate transmitter, select a transmission pattern, record and store the transmission completion time
302
Active receiver, measure the received signal strength intensity (RSSI), detect the transmit pattern, record and store the time of detection
303
Based on RSSI decide if continue with environment parameter
304
Calculate the time between completion of transmission and detection of transmit pattern then subtract the transmit time and receive time within the transceiver.
305
Calculate the distance d = vt, where "d" is distance, "v" is the velocity of wave in the air and "t" is the time transmit pattern is in the air from completion of transmission to detection of the transmit pattern
306
Use the difference between two measured distances "d1 – d2" and the difference between the transmitter pattern detection time for these two distance "t1 – t2" to calculate the object approaching speed = Vo = (d1 – d2)/(t1 – t2)
307
Calculate force based on the estimated Mass = m and a = acceleration or deceleration. F = m.a where "a" can be calculated from change in speed during specified time.

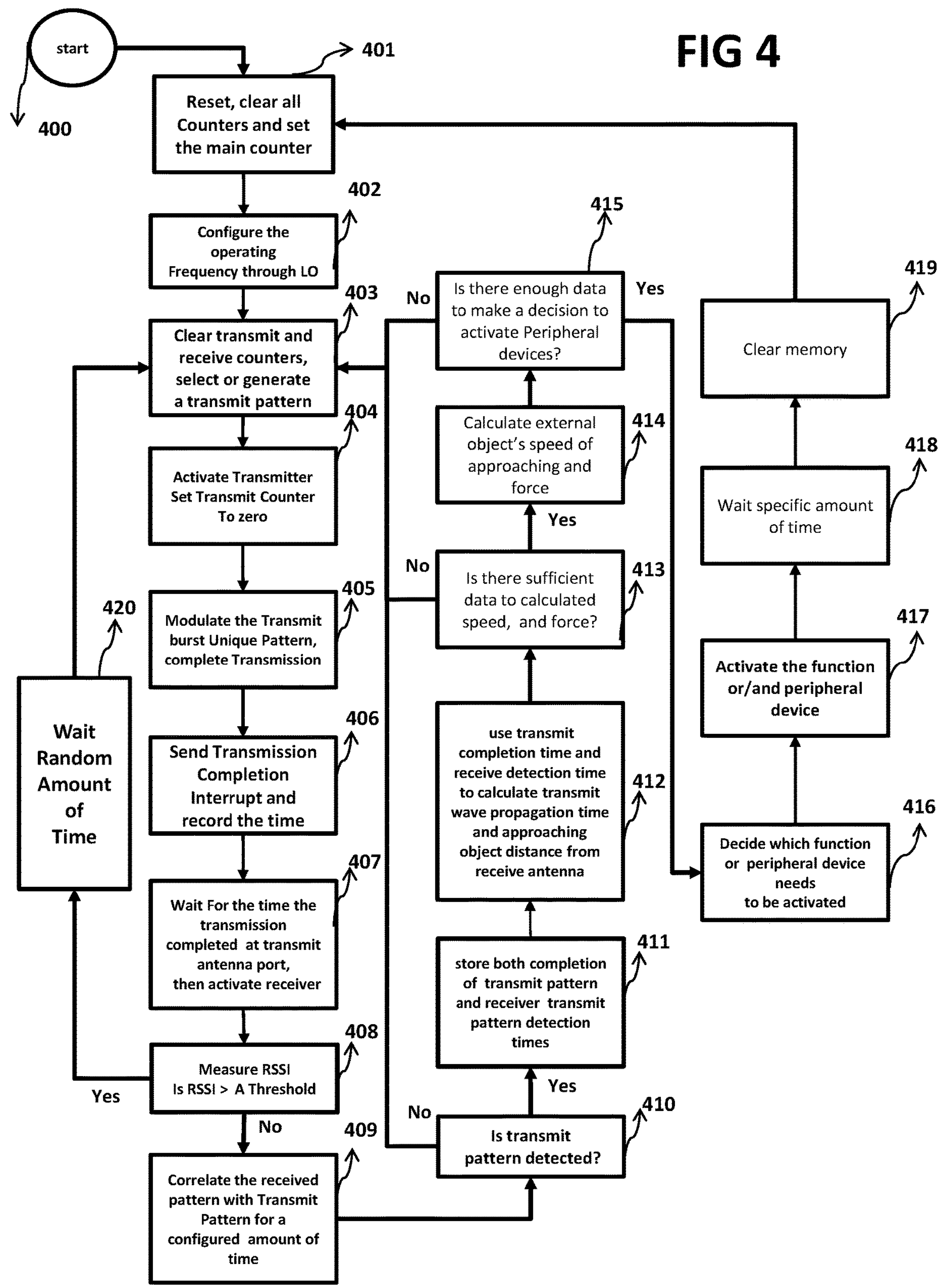
FIG 4
start
400
401
Reset, clear all Counters and set the main counter
402
Configure the operating Frequency through LO
403
Clear transmit and receive counters, select or generate a transmit pattern
404
Activate Transmitter Set Transmit Counter To zero
405
Modulate the Transmit burst Unique Pattern, complete Transmission
406
Send Transmission Completion Interrupt and record the time
407
Wait For the time the transmission completed at transmit antenna port, then activate receiver
408
Measure RSSI Is RSSI > A Threshold
Yes
No
409
Correlate the received pattern with Transmit Pattern for a configured amount of time
410
Is transmit pattern detected?
No
Yes
411
store both completion of transmit pattern and receiver transmit pattern detection times
412
use transmit completion time and receive detection time to calculate transmit wave propagation time and approaching object distance from receive antenna
413
Is there sufficient data to calculated speed, and force?
No
Yes
414
Calculate external object's speed of approaching and force
415
Is there enough data to make a decision to activate Peripheral devices?
No
Yes
416
Decide which function or peripheral device needs to be activated
417
Activate the function or/and peripheral device
418
Wait specific amount of time
419
Clear memory
420
Wait Random Amount of Time

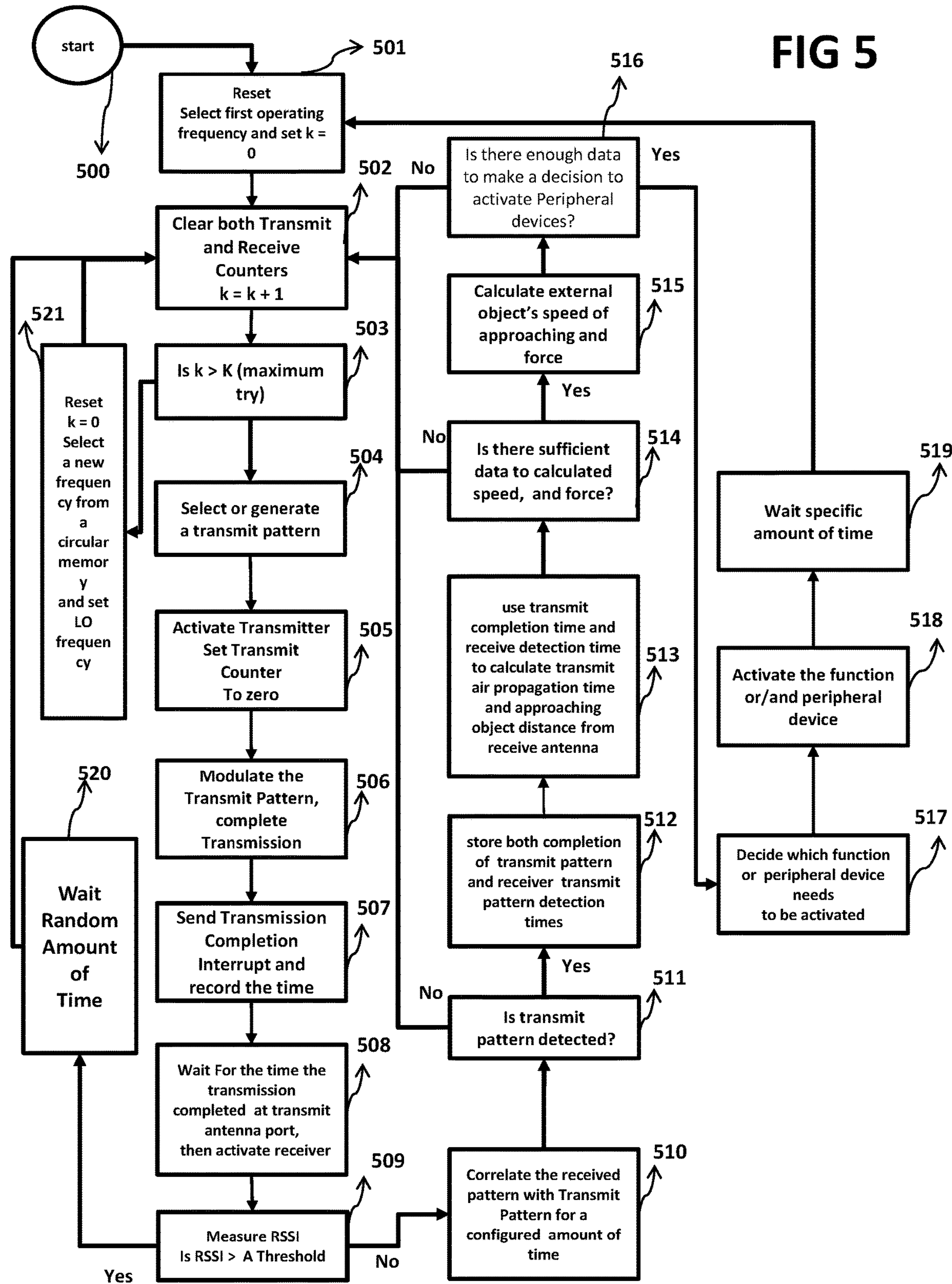

FIG 5
start
500
Reset
Select first operating frequency and set k = 0
501
Clear both Transmit and Receive Counters
k = k + 1
502
Is k > K (maximum try)
503
Select or generate a transmit pattern
504
Activate Transmitter
Set Transmit Counter
To zero
505
Modulate the Transmit Pattern, complete Transmission
506
Send Transmission Completion Interrupt and record the time
507
Wait For the time the transmission completed at transmit antenna port, then activate receiver
508
Measure RSSI
Is RSSI > A Threshold
509
Yes
No
Correlate the received pattern with Transmit Pattern for a configured amount of time
510
Is transmit pattern detected?
511
No
Yes
store both completion of transmit pattern and receiver transmit pattern detection times
512
use transmit completion time and receive detection time to calculate transmit air propagation time and approaching object distance from receive antenna
513
Is there sufficient data to calculated speed, and force?
514
No
Yes
Calculate external object's speed of approaching and force
515
Is there enough data to make a decision to activate Peripheral devices?
516
No
Yes
Decide which function or peripheral device needs to be activated
517
Activate the function or/and peripheral device
518
Wait specific amount of time
519
Wait Random Amount of Time
520
Reset
k = 0
Select a new frequen cy from a circular memor y and set LO frequen cy
521

CONTROL ALGORITHM FOR WIRELESS SENSOR TO ESTIMATE AND CALCULATE ENVIRONMENTAL PARAMETERS

The application claims priority to the following related application and included here is as a reference.

Provisional application: U.S. patent application No. 62/157,936 filed May 6, 2015, and entitled "A CONTROL ALGORITHM FOR WIRELESS SENSOR TO ESTIMATE AND CALCULATE ENVIRONMENTAL PARAMETERS."

This application is related to patent application Ser. Nos. 13/815,347, and 13/694,968, and issued U.S. Pat. Nos. 8,891,696, and 8,706,067

BACKGROUND

In the recent past, wireless sensors have found their way into a wide variety of applications and systems with vastly varying requirements and characteristics. Wireless sensors offer a powerful combination of distributed sensing, computing and communication. They lend themselves to countless applications and, at the same time, offer numerous challenges due to their peculiarities, primarily the stringent energy constraints to which wireless sensors are typically subjected. The distinguishing traits of wireless sensors have a direct impact on the hardware and algorithm design at four levels: power source, hardware, accuracy of detection, and speed of protection.

Automatic detection and prevention of certain accidents is but one of many potential applications of wireless sensors. Wireless sensors have captured the attention and imagination of many researchers, encompassing a broad spectrum of the ideas. Despite their variety, all wireless sensors have certain fundamental features in common. Perhaps most essential is that they are embedded in the real world. Wireless sensors detect the world's physical nature, such as surrounding objects, their proximity, their distance and speed. Similarly, actuators affect the world in some way, such as activating a device, making a noise, or exerting a force. Such a close relationship with physical world is a dramatic contrast to much of traditional computing, which often exist in virtual world.

Smart environments represent the next evolutionary development step in building, utilities, industrial, home, shipboard, and transportation systems automation. Like any sentient organism, the smart environment relies first and foremost on sensory data from the real world. Sensory data comes from multiple sensors of different modalities in distributed locations. The smart environment needs information about its surroundings as well as about its internal workings.

Wireless sensors are standard measurement tools equipped with transceiver to convert signals from a control processor into a radio transmission and then receive the reflected signal by a receiver which then detects the received signal and sends it to a processor to be analyzed. There are a number of items to consider when selecting a wireless measurement instrument.

Type of Measurement:

It is important to understand what is being measured. Wireless transceivers sensor (which incorporate wireless process measurement and control) typically have a unique function. Sensors are specifically designed for speed, distance, flow, etc., and must be selected accordingly.

Accuracy and Response Time:

How accurate does the measurement need to be, and how quickly should the measurement be updated? Most wireless sensors are as accurate as their wired counterparts; however a signal is typically transmitted frequent enough to allow for accurate measurement while preserving battery power.

Range:

The range of wireless sensors varies widely. Some are designed for short-range of a few feet, while other sensors can cover few hundred feet. Regardless of the sensors capability, the range of a wireless signal is always limited by signal bandwidth, and frequency of operation. For certain applications very high operating frequency has to be used which limit the operation range.

Frequency:

The frequency of radio transmission is also important to consider. Laws vary by country and region as to which parts of the wireless spectrum are available for use without specific licenses. Accuracy and response time in certain application depends on operating frequency, the higher the frequency the more accurate the measurement of certain parameters.

Various components of a wireless sensor system are;

Transmitters:

In certain applications the transmitters use particular signals to send via radio waves to a receiver.

Receiver:

receives and interpret the wireless data. The receiver 'reads' a radio signal, utilize it to estimate and calculate certain parameters, and then send them to a controller to make decision.

Controller:

receives and analyze data from wireless receiver. However, the wireless controller is also able to manipulate a process based on the data being measured.

This disclosure is an algorithm to control the function of a wireless sensor to estimate distance and speed of an object external to the sensor. This wireless sensor can be used in a drone, robot, body armors, automobiles, and any other stationary and moving equipment.

BRIEF DESCRIPTION OF THE DRAWINGS

FIG. 3 depicts the process steps to calculate environmental parameters.

FIG. 4 shows an embodiment of wireless sensor control algorithm when one frequency is used for transmission and reception.

FIG. 5 shows an embodiment of wireless sensor control algorithm when more than one frequency is used for transmission and reception.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
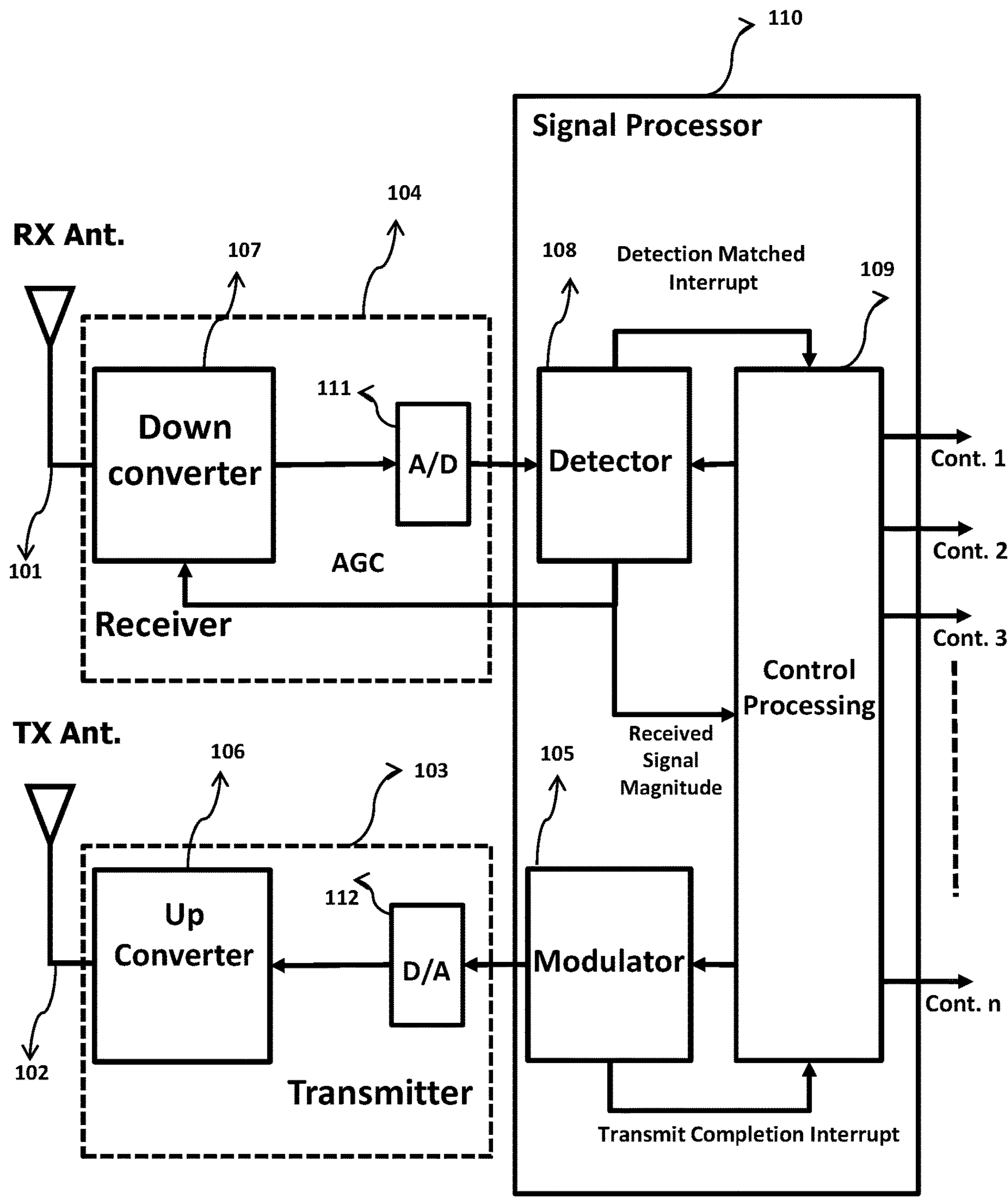
FIG. 1 illustrates an embodiment of a wireless sensing system.

FIG. 1 depicts an embodiment of wireless sensor system 100. In general, wireless sensor system 100 facilitates estimation and calculation of certain parameters by transmitting a coded signal like an IP address generated by a control processor 109 through a modulator 105, a transmitter 103 and antenna 102 and then receiving the attenuated version of the same coded signal by an antenna 101, receiver 104 and detector 108. For example, control processor 109 creates a random transmit pattern, send it to modulator 105 for modulation then the modulated signal is sent to transmitter 103 to be converted to analog signal by digital-to-analog (D/A) converter 112 and up converted to carrier frequency by up convertor 106 for transmission through antenna 102. The modulator 105 also sends the time of completion of modulation to control processor 109. Then the reflected transmit signal from an object in the environment is received by antenna 101 and receiver 104, where it is down converted by down convertor 107 and converted to digital signal by analog-to-digital (A/D) converter 111. The digitized received signal is processed in signal processing unit 110, where it is detected by detector 108 and detection time is processed by control processor 109. The down converted digitized received signal also facilitates measurement of received signal strength intensity (RSSI) to provide to control processor 109.

Wireless sensor system 100 includes, among other things, signal processor 110, transmitter 103, transmit antenna 102, receive antenna 101, and receiver 104.

In one embodiment, signal processor 110, transmit antenna 102, transmitter 103, receive antenna 101, and receiver 104 are components of wireless sensor system 100 that could be used for various applications. For example, it can be used in robotics, automated automobiles, helmets, traffic monitoring, and etc.

In one embodiment, signal processor 110 that processes both transmit and receive signal comprises of control processor 109, modulator 105, and detector 108.

Signal processor 110 is for processing information transmitted from transmitter 103 through antenna 102 and information received from receiver 104 through receive antenna 101. The signal processor 110 also provides gain control signal for receiver and facilitates change of transceiver operating frequency. Signal processor 110 typically utilizes appropriate hardware and software algorithm to properly process the information.

Wireless sensor system 100 can be any wireless transceiver that is able to wirelessly transmit communication signals, such as short coded pattern. Wireless sensor system 100 is disposed on any physical platform that is conductive to effectively transmit the signals.

In one embodiment, transmit patterns through wireless system 100 are selected by signal processor 110.

In one embodiment, communications through wireless system 100 are by a transmit antenna 102 and a received antenna 101. Transmit and receive antennas are physically separated to provide sufficient isolation between transmit and receive antennas.

In one embodiment, communications through wireless system 100 are transmitted by a transmit antenna 102.

In one embodiment, communications through wireless system 100 are received by a receive antenna 101.

In one embodiment, communications through wireless system 100 are transmitted and received by a single antenna. In general at any specified period of time the antenna is selected by a switch and/or a circulator.

Signal Processor 110 has a variety of functions. In general, signal processor 110 is utilized for signal processing, calculation, estimation, activities, methods, procedures, and tools that pertain to the operation, administration, maintenance, and provisioning of wireless sensor. In one embodiment, signal processor 110 includes a database that is used for various applications. The database can be utilized for analyzing statistics in real-time.

Signal processor 110 also has a variety of thresholds. In general, signal processor 110 provides controls to various components that are connected to it. Moreover, signal processor 110 is a high capacity communication facility that connects primary nodes.

In one embodiment the wireless sensor system 100 is a transceiver that periodically switches between transmission and reception. During transmission a signal is transmitted and during the reception period the reflected signals from the surrounding environment objects are received. The received signal by receiver 104 is then digitized and sent to signal processor 110 for further processing.

In one embodiment the wireless sensors 100 are microwave, or mili-metric wave transceivers.

In one embodiment wireless sensor system 100 is controlled by control processor 109. The control processor 109 controls transmit pulse width and number of times a pulse is transmitted by wireless sensor system 100. Control processor 109 also coordinates the transmit time and receive time period for the wireless sensors 100.

In one embodiment the wireless sensor can be used for body armors, automobile, robots, drone, and any other stationary and moving equipment.

Figure 2:
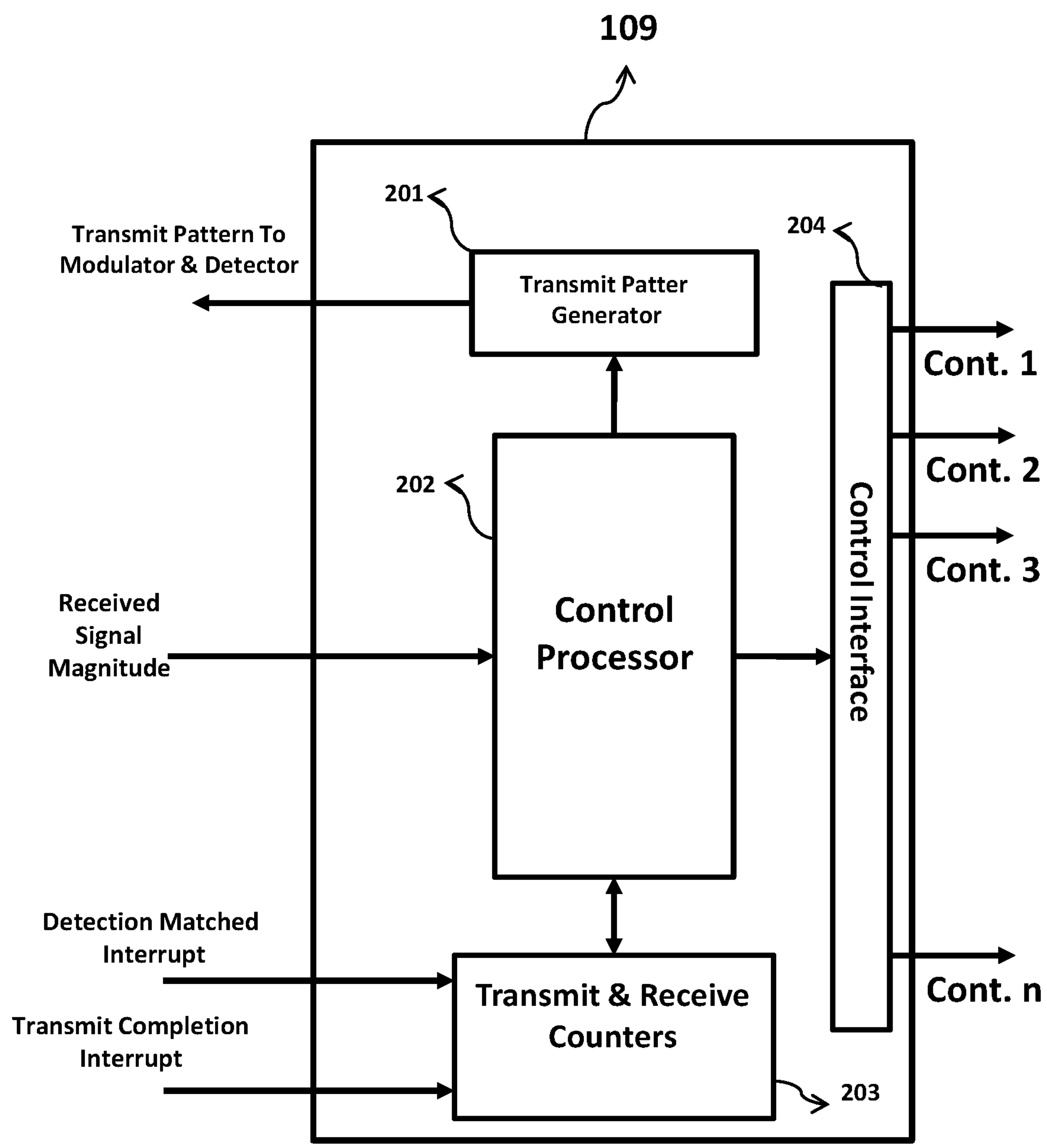
FIG. 2 illustrates embodiments of a control processor for a wireless sensor.

FIG. 2 depicts an embodiment of control processor 109. In general, control processor 109 facilitates in estimating and calculating various environmental parameters. The control processor 109 comprises of a transmit pattern generator 201, a counter 203, a control interface 204 and a processor 202.

In one embodiment, the control processor 109 generates the transmit pattern through pattern generator 201 and send it to transmitter for transmission.

In one embodiment, the control processor 109 through a counter 203 controls all the timings including transmit time, time of power measurement, time of matching of transmit patterns with receive pattern.

In one embodiment, the processor 202 uses all the timing information, receive signal strength and peak detector output to estimate and calculate various environmental parameters.

In one embodiment, the processor 202 based on the estimated and calculated parameters activate various control signals to be used by peripheral devices to wireless sensor 100.

FIG. 3 depicts an embodiment of method 300 for using a wireless sensor to estimate and calculate environmental parameters. In various embodiments, method 300 is carried out by processor and electrical circuit under the control of a processes or executable instructions. The readable and executable instructions reside, for example, in a data storage medium such as processor usable volatile and non-volatile memory. However, the readable and executable instructions may reside in any type of processor readable storage medium. In some embodiments, method 300 is performed at least by one of the circuits described herein.

At 301 of method 300, the transmitter is activated, a transmit pattern like an IP address is generated, the pattern is transmitted and a timing counter is initiated. For example, transmit pattern is generated in control processor 109 and then is modulated in modulator 105 and up converted to radio frequency in transmitter 103 before being transmitted by transmit antenna 102. The time of counter 203 in control processor 109 is recorded at the completion of transmission and stored in control processor 109.

At 302 of method 300, after completion of transmission the detector 108 is activated, the received signal strength intensity (RSSI) is measured, the transmit pattern is detected in detector 108 and the detection time is recorded from counter 203 and stored in control processor 109.

At 303 of method 300, the receiver 104 starts measurement of RSSI, compare it with pre-configured threshold, and the control processor 109 decides whether to continue with calculation of environmental parameters.

At 304 of method 300, the traveling time of the transmit pattern from transmit antenna 102, reflected from an object in the environment, and received at receive antenna 101 is calculated. This is done by calculating the time between completion of transmission time and detection of transmit pattern time and then subtracting the transmit time and receive time within the transceiver, all stored in control processor 109.

At 305 of method 300, the control processor calculates the distance between an external object and the receiver antenna 101. This is done by the formula $d=vt/2$, where "d" is distance, "v" is the velocity of wave in the air and "t" is the time transmit pattern is in the air from completion of transmission to detection of the transmit pattern.

At 306 of method 300, the control processor calculates the speed of an external object approaching the receive antenna 101. This is done by using the difference between two measured distances "d1−d2" and the difference between the transmitter pattern detection times for these two distance "t1−t2". Then the control processor 109 calculates the object approaching speed using formula $Vo=(d1-d2)/(t1-t2)$ where Vo is the approaching speed.

At 307 of method 300, the control processor 109 calculates the force from an external object. Control processor 109 calculates force based on the estimated Mass=m of the object and "a"=acceleration or deceleration by using formula $F=m\cdot a$ where "a" can be calculated from change in speed during specified time.

FIG. 4 shows an embodiment of wireless sensor control algorithm when one frequency is used for transmission and reception.

The algorithm start at 400 is when the wireless sensor system is activated, powered on or resets.

At 401 the control processor clears all timers for transmission of a particular pattern, sets the main timer. All timers including the transmit completion times and receive detection times are based on the system main timer.

At 402 the control processor 109 configures the operating frequency for the transceiver through local oscillator (LO).

At 403 a transmit pattern is selected or generated. A random pattern generator can be used to generate the transmit pattern. The transmit pattern can also be selected from pre-configured patterns. The transmit and receive counters are also cleared.

At 404 the transmitter is activated and the counter for transmitter is set to zero.

At 405 the transmit pattern is modulated then up-converted to be transmitter by transmit antenna until the transmission is completed.

At 406 a transmission completion interrupt is sent to controller 109 and the time for transmission completion is recorded.

At 407 wait for the time the transmission completed at transmit antenna port, then activate receiver.

At 408 the received signal strength intensity (RSSI) is measured and then checked if the RSSI is greater than or equal to a threshold. If RSSI is greater than or equal to the threshold the process continues at 420. If RSSI is less than threshold the process continues at 409.

At 420 wait for a random amount of time and then continue at 403.

At 409 correlate the received pattern with Transmit Pattern for a configured amount of time. The maximum correlation time is defined by the maximum distance from receive antenna that is being monitored.

At 410 check if the transmit pattern is detected. If detected continue at 411 and if not continue at 403.

At 411 store both completion of transmit pattern and receiver transmit pattern detection times.

At 412 use transmit completion time and receive detection time to calculate transmit wave propagation time. Then use the propagation time to calculate the approaching object distance from receive antenna.

At 413 check if there is sufficient data to calculated speed. For calculating approaching speed of a particular object there is a need for minimum two consecutive distance measurement. If there is not sufficient data then continue at 403.

At 414 calculate external object's speed of approaching to receiver antenna by using two consecutive measured distances and the time of detection of transmit pattern in these two measurements. The collision force due a particular object is calculated using its speed of approaching at the time of impact, its estimated mass and estimated time to decelerate.

At 415 check if there is enough data to make a decision to activate functions or peripheral devices. If there is enough data to make a decision continue at 415. If there is not enough data to make a decision continue at 403.

At 416 the control processor decides which function or device to activate and then proceed to 417.

At 417 the selected function or device is activated and proceeds to 418.

At 418 control processor stop processing for a defined amount of time. When the wait time finished then control processor proceeds to 419.

At 419 the control processor clear all memories and continue at 401.

FIG. 5 shows an embodiment of wireless sensor control algorithm when multiple frequencies are used for transmission and reception.

The algorithm start at 500 is when the wireless sensor system is activated, powered on or resets.

At 501 the control processor resets and selects an operating frequency. Then it set k=0, where "k" is the number of times measurements are done with selected frequency. Maximum number of measurements with one frequency is "K".

At 502 the control processor 109 clears the transmitter and receiver counters and increment "k".

At 503 the control processor checks if "k" is greater than "K". If it is then continue at 521. If it is not proceeds to 504.

At 521 the control processor resets the wireless sensor, select a new frequency from a circular memory, sets the local oscillator (LO) frequency, sets "k"=0 and proceeds to 502.

At 504 control processor select or generate a transmit pattern and then proceeds at 505.

At 505 the transmitter is activated and the counter for transmitter is set to zero.

At 506 the transmit pattern is modulated then up-converted to be transmitter by transmit antenna until the transmission is completed.

At 507 a transmission completion interrupt is sent to controller 109 and the time for transmission completion is recorded.

At 508 wait for the time the transmission completed at transmit antenna port, then activate receiver.

At 509 the received signal strength intensity (RSSI) is measured and then checked if the RSSI is greater than or equal to a threshold. If RSSI is greater than or equal to the threshold the process continues at 520. If RSSI is less than threshold the process continues at 510.

At 520 wait for a random amount of time and then continue at 502.

At 510 correlate the received pattern with Transmit Pattern for a configured amount of time. The maximum correlation time is defined by the maximum distance from receive antenna that is being monitored.

At 511 check if the transmit pattern is detected. If detected continue at 512 and if not continue at 502.

At 512 store both completion of transmit pattern transmission and receiver transmit pattern detection times.

At 513 use transmit completion time and receive detection time to calculate transmit wave propagation time. Then use the propagation time to calculate the approaching object distance from receive antenna.

At 514 check if there is sufficient data to calculated speed. For calculating approaching speed of a particular object there is a need for at leat minimum two consecutive distance measurements.

At 515 calculate external object's speed of approaching to receiver antenna by using two consecutive measured distances and the time of detection of transmit pattern in these two measurements. The collision force due a particular object is calculated using its speed of approaching at the time of impact, its estimated mass and estimated time to decelerate.

At 516 check if there is enough data to make a decision to activate functions or peripheral devices. If there is enough data to make a decision continue at 517. If there is not enough data to make a decision continue at 502.

At 517 the control processor decides which function or device to activate and then proceed to 518.

At 518 the selected function or device is activated and proceeds to 519.

At 519 control processor stop processing for a defined amount of time. When the wait time finished then control processor proceeds to 501.

Various embodiments are thus described. While particular embodiments have been described, it should be appreciated that the embodiments should not be construed as limited by such description, but rather construed according to the following claims.

The invention claimed is:

1. A wireless sensor with a control algorithm comprising:

a transmitter configured to transmit using a carrier frequency and modulation, via an antenna, at least one of a coded burst pattern and an IP (Internet Protocol) address pattern to a surrounding environment of said wireless sensor;

a receiver configured to receive at said carrier frequency and modulation, via the antenna, a reflected signal of at least one of said coded burst pattern and said IP address pattern from an object in said surrounding environment of said wireless sensor;

a processor configured to:

record a time of completion of transmission of at least one of said coded burst pattern and said IP address pattern;

measure a received signal strength intensity (RSSI) of said reflected signal;

reject said reflected signal if said RSSI is more than a threshold value then wait a random time before transmitting again;

keep said reflected signal for further processing if said RSSI is less than said threshold value;

detect at least one of said coded burst pattern and said IP address pattern from said reflected signal and record a time of completion of detection;

calculate from said time of completion of transmission and said time of completion of detection a distance, and an approaching speed of said object in said surrounding environment of said wireless sensor;

evaluate said distance and said approaching speed of said object to determine whether said processor needs to activate a device or a function.

2. The wireless sensor of claim 1, wherein said processor after activation of said device or said function waits a random time, resets and then continues measurement of said distance and said approaching speed of said object.

3. The wireless sensor of claim 1, wherein said processor repeats a measurement process by changing the wireless sensor's said carrier frequency and modulation if a number of measurements exceed a predefined value.

4. The wireless sensor of claim 1, wherein said processor changes the wireless sensor's said carrier frequency and modulation to change an operating range and accuracy of said distance and said approaching speed of said object in said surrounding environment of said wireless sensor.

* * * * *